April 23, 1940.   J. L. ANDERSON   2,197,963
WELDING APPARATUS
Filed Jan. 22, 1937   4 Sheets-Sheet 2

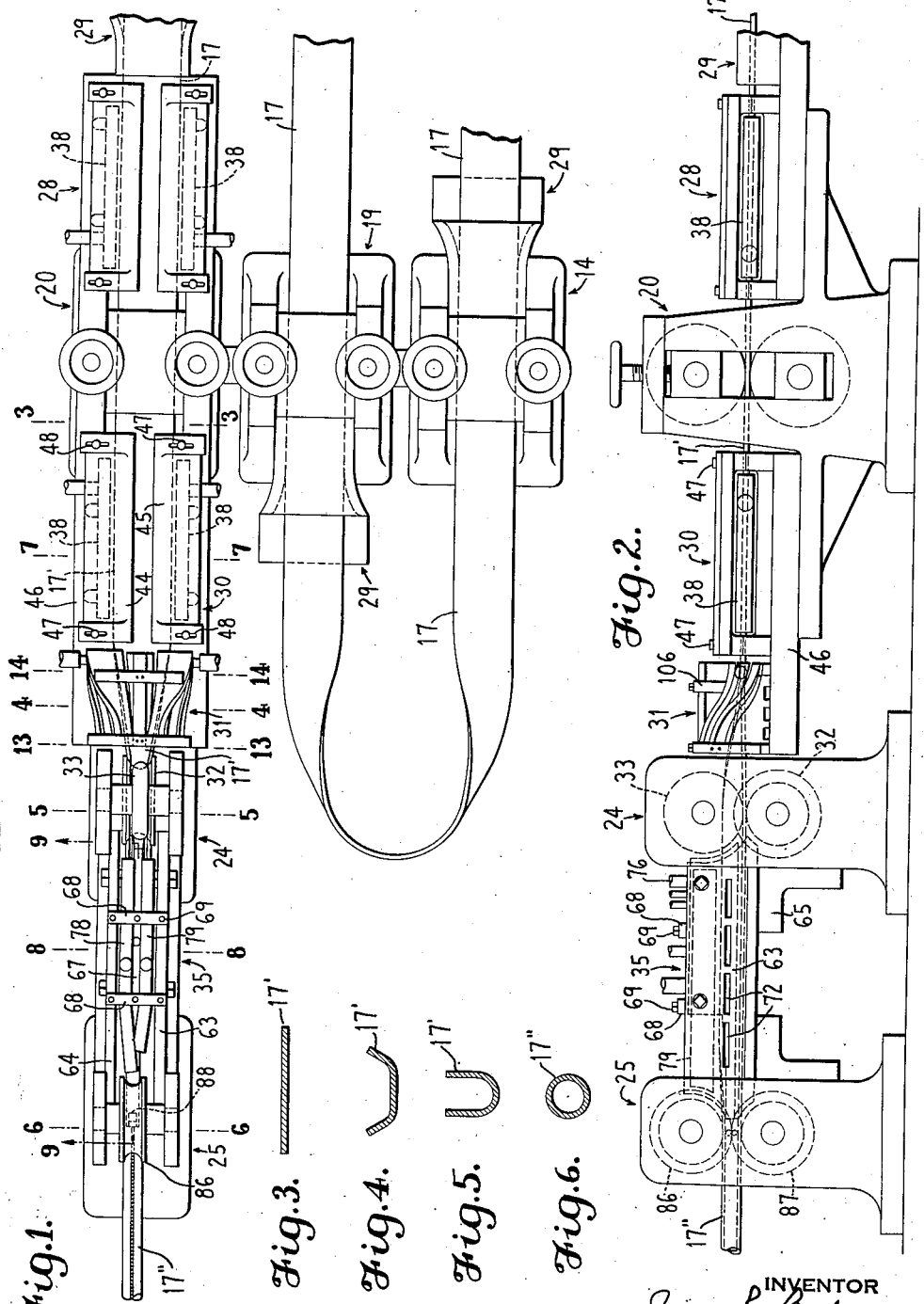

INVENTOR
James L. Anderson
BY
ATTORNEY

April 23, 1940.   J. L. ANDERSON   2,197,963
WELDING APPARATUS
Filed Jan. 22, 1937   4 Sheets-Sheet 3
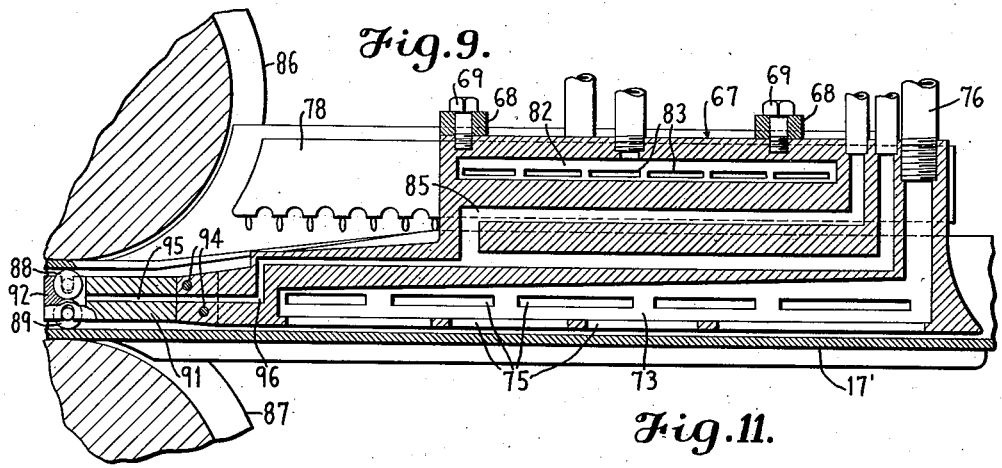
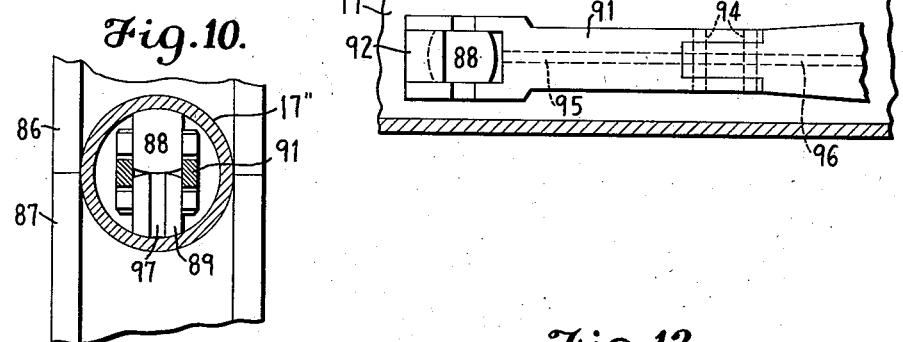
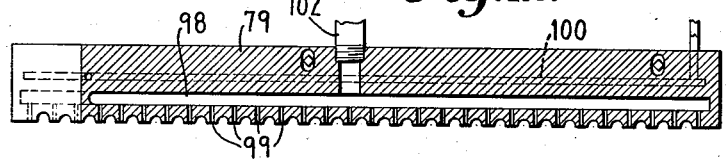
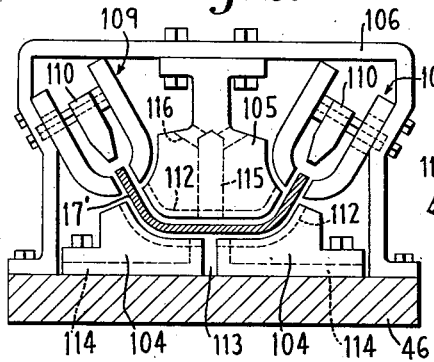
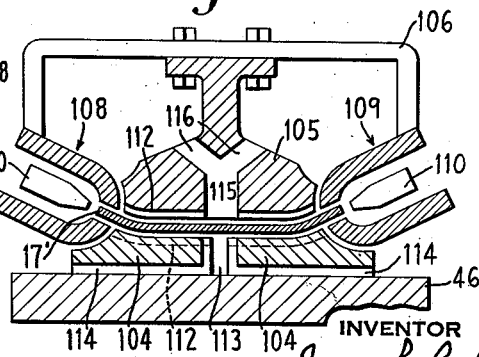

April 23, 1940. J. L. ANDERSON 2,197,963
WELDING APPARATUS
Filed Jan. 22, 1937 4 Sheets-Sheet 4
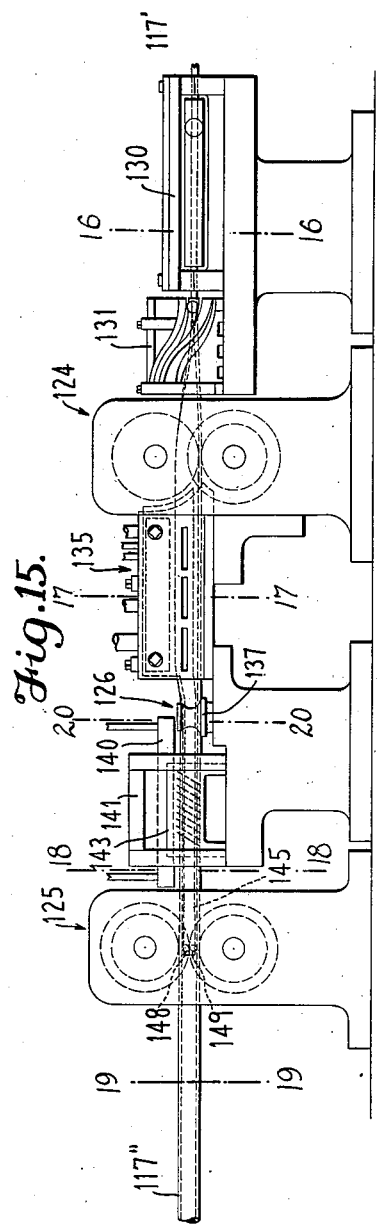
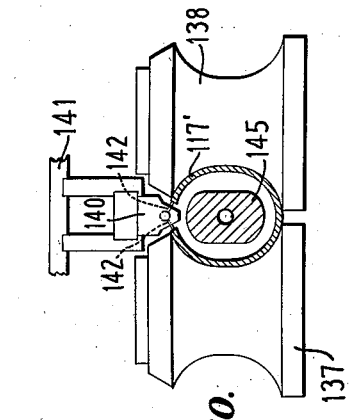
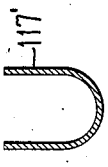
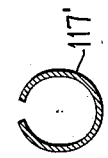
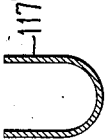
INVENTOR
James L. Anderson
BY
ATTORNEY Patented Apr. 23, 1940

2,197,963

UNITED STATES PATENT OFFICE 2,197,963

WELDING APPARATUS

James L. Anderson, Closter, N. J., assignor to Air Reduction Company, Incorporated, New York, N. Y., a corporation of New York Application January 22, 1937, Serial No. 121,789

11 Claims. (Cl. 78—83)

This invention relates to apparatus for the manufacture of welded pipe and tubing.

One object of the invention is to provide improved heating retort means which raise the edge faces of a traveling skelp to a welding condition so rapidly that welded pipe and tubing can be made at speeds equal to the rate of discharge of skelp from a rolling mill, and as a continuous operation with the rolling of the metal to a flat skelp. Such a continuous operation is disclosed in my application Serial No. 732,593, filed June 27, 1934, (now Patent No. 2,084,375, dated June 22, 1937), of which this case is a continuation in part.

Another object of the invention is to project heating jets directly against the warped surface that is presented by the edge face of a partially-formed skelp as it changes its contour during a progressive forming operation, as when passing between successive stands of a forming mill.

One feature of the invention relates to the protection of hot skelp, and particularly the edge faces, from oxidation during the forming of the skelp into a welded tube. The edges are not only protected from oxidation during the time that the strip is being bent and the edges brought together to make a weld, but parts of the skelp edges which may be already oxidized to some extent are reduced and purified before they come together to make the weld.

In the accompanying drawings, forming part hereof:

Fig. 1 is a top plan view showing an embodiment of the invention in apparatus which rolls metal to a flat skelp and forms the skelp into a tube in a continuous operation;

Fig. 2 is a side elevation of the apparatus of Fig. 1, but showing only the last stand of the skelp mill;

Figs. 3–6 are sectional views through the skelp, showing its shape at various stages during the forming step;

Figure 7:
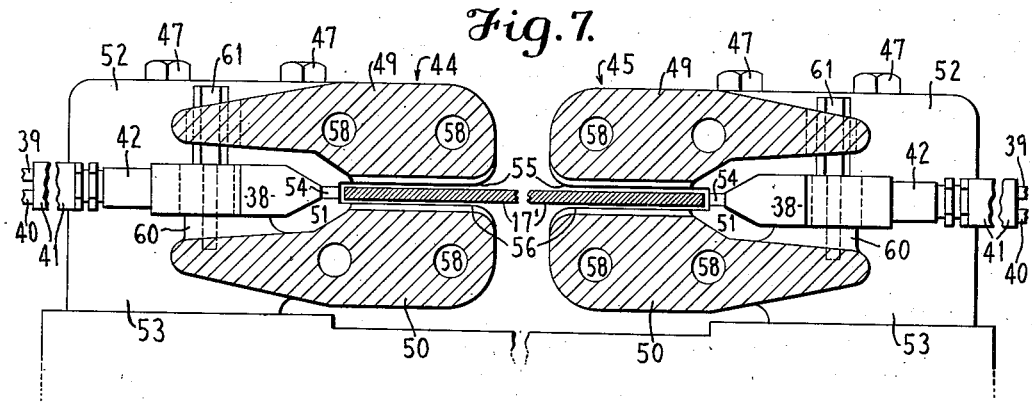
Figure 8:
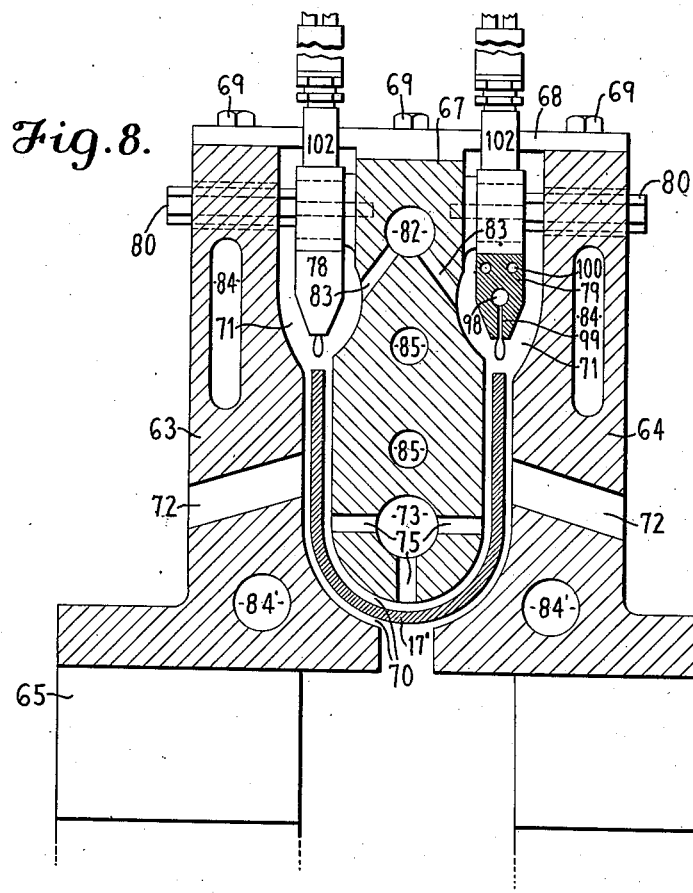

Figs. 7 and 8 are enlarged sectional views of the heating retorts through which the skelp passes when flat and partially formed, the sections being taken on the lines 7—7 and 8—8, respectively, of Fig. 1;

Fig. 9 is an enlarged sectional view on the line 9—9 of Fig. 1;

Figs. 10 and 11 are enlarged detail views, partly in section, showing the rollers and mandrel illustrated in Fig. 9;

Fig. 12 is a reduced longitudinal sectional view of one of the torches shown in Fig. 1;

Figs. 13 and 14 are enlarged sectional views on the lines 13—13 and 14—14, respectively, of Fig. 1;

Fig. 15 is a side elevation similar to Fig. 2 but showing a modified form of the invention;

Figs. 16–19 are enlarged sectional views taken on the lines 16—16 to 19—19, respectively, of Fig. 15; and Fig. 20 is an enlarged sectional view on the line 20—20 of Fig. 15.

In a continuous rolling, forming, and welding operation, such as illustrated in Fig. 1, an intermediate strip from the last pass of a reducing mill is transferred into a first stand 14 of a skelp mill. The flexible metal strip is indicated by the reference character 17, the skelp and partially-formed tube by 17', and the welded tube by 17''. The metal strip 17 is threaded back and forth through the successive stands of the skelp mill, the thickness of the strip being reduced in each stand. This mill arrangement is illustrative. All stands of a skelp mill may be in line, or in line also with preliminary reducing stands in a straight-through operation.

Besides the first stand 14, the skelp mill shown in Fig. 1 has an intermediate stand 19 and a last stand 20, besides which there may be other stands or passes.

Passage of the metal strip 17 through the last stand 20 of the skelp mill effects the final reduction in thickness necessary to produce a skelp of the desired gauge for the tube. The reduction in the thickness of the metal in each rolling pass increases the length of the strip and therefore the lineal speed. The skelp 17' issues rapidly from the final rolling pass through the last stand 20.

The skelp mill is driven by a motor, and there is a forming mill comprising stands 24 and 25 in line with the last stand 20 of the skelp mill in position to receive the skelp from the final rolling pass. The rollers of the forming stands 24 and 25 may be driven from the same motor as the skelp mill through suitable gearing.

Before entering the final rolling pass 20, the rapidly moving hot strip 17 passes through a retort 28 in which the edges of the strip are heated, preferably by oxyacetylene flames, though other flame heating means may be employed. The term "retort" as used in the description and in the claims denotes an enclosure in which at least a part of the metal strip or partially-formed tube is heated and the products of combustion confined during their movement away from the heating flames. A guide 29 at the entrance end of the retort 28 guides the end of the strip 17 into the retort 28 and rolling stand 20 when the strip is first threaded through the skelp mill. There are similar guides at the entrances to the other rolling stands 14 and 19.

The flames in the retort 28 increase the heat of the skelp along its edges, in addition to which the hot products of combustion that sweep across the upper and lower surfaces of the strip sustain the temperature at the edges by reducing the temperature gradient from the edges to the interior of the strip. A useful effect of heating the strip in this manner before it goes through the final flat rolling pass is to eliminate a part of the mill scale then present on the strip and keep it from being rolled into the skelp surfaces.

Between the final rolling pass 20 and the first forming pass 24, the skelp travels through a retort 30, which is similar to the retort 28, and further increases the temperature of the skelp edges.

As the skelp bends from its flat condition in the retort 30 to the partially-formed condition assumed in the first pass 24 of the forming mill, it travels through a retort 31 which has guides and burners shaped to conform to the change in the cross-section of the skelp as it bends under the influence of the first forming pass 24 or breakdown pass. It is not necessary to the invention that the forming be done in rolls. A forming die can be used in one or more stands, but rolls are required for feeding the metal through such a die when used in a continuous operation.

In the forming pass 24 the skelp is confined between a grooved roller 32 (Fig. 1) and a roller 33 which has a convex face extending into the groove. A section through the partially-formed skelp is shown in Fig. 4, and another section, as it leaves the forming pass 24, is shown in Fig. 5. The center portion of the skelp is bent into an arc of substantially 180 degrees and the side portions extend upward substantially parallel to one another. The forming in this first pass 24 may be less than that shown in the drawings, that is, the arc into which the skelp is bent may be less than 180 degrees and may extend across more or less of the width of the skelp. The amount of forming which should be imparted to the skelp in the first forming pass is largely dependent on the number of subsequent passes in the forming mill. There may be several forming passes, between certain of which the skelp may be bent to a greater degree than is shown in the drawings. Thus, the side portions of the skelp may slope inward instead of being parallel, but it is a feature of the invention that the edges of the partially-formed skelp be widely spaced and so disposed that the heating flames can be applied directly against the edge faces.

This partially-formed skelp section proceeds through a retort 35, which is shaped to receive the skelp in the form with which it leaves this forming pass 24. The forward and rearward ends of the retort 35 are shaped to extend partially between the rolls of the forming mill in order to obtain the greatest possible length for the retort 35 within the distance between the stands of the forming mill.

The edge faces of the skelp are finally purified and are heated to surface fusion in the retort 35 and while in this state are brought together in the final forming pass 25 to cause the clean fused metal on the edge faces to unite and form a strong and perfect weld. Welded tubes made in this manner can be bent sharply or flanged without breaking the weld, and can be drawn to reduce the diameter and/or wall thickness. This latter operation results in a severe working of the metal and is employed to produce tubes of great strength.

If especially high-grade pipe or tubing should not be required, the invention may be employed to produce pressure-welded pipe or tubing of uniformly good quality and with great economy of heat. The economy of heat is made possible by the direct manner in which the heat is applied to the edges and by the uniform heating which makes it unnecessary to raise the temperature of some parts of the skelp higher than necessary while bringing adjacent portions to a welding state. When the edge faces are not brought to surface fusion, it is necessary to adjust the rolls in the final forming pass 25 so that the edges of the skelp are brought together under considerable pressure, or to employ a closing die or bell for obtaining such pressure.

All of the added heat for raising the skelp edges to surface fusion or to a welding state may be put into the edges in the retort 35 if the distance is made long enough, but in a plant such as illustrated retorts between three or more mill passes are more effective and permit of very high speeds. The torches and retorts applying heat to the skelp in stages as it travels between successive mill passes makes it possible to bring the edge faces to surface fusion, notwithstanding speeds of travel of the skelp as high as a thousand feet per minute, or higher.

Fig. 7 is an enlarged sectional view through the retort 30 with the center portion of the skelp broken out. The retort 28 is of similar construction.

Burner blocks 38 are located in position to direct flames, preferably oxyacetylene flames, against the edge faces of the skelp 17'. Oxygen and fuel gas are supplied to each of the burner blocks through pipes 39 and 40 connecting with a stock 41 of the burner block. The gas passages in the stocks and burner blocks need not be illustrated. It will be understood that the oxygen and fuel gas are brought together by suitable mixers in the stocks 41, or in stems 42 by which the stocks are connected to the burner block, and the mixed gases distributed by longitudinal passages in the blocks, from which they issue through jet orifices. The flame system directed against the edge faces of the skelp may be a single or double row of closely spaced jets, or staggered jets, or one or more ribbon flames.

By the use of an oxyacetylene flame mixture the skelp edges can be heated to welding state or to fusion at high rates of travel of the skelp. Other fuel gases or vapors may, however, be employed. The oxygen supplied to the flame mixture is preferably commercially pure oxygen, though mixtures of fuel gas and oxygen-enriched air or the like may be used. With several stages of heating, it is possible to employ mixtures of different compositions in different stages, and with a sufficiently extended edge-heating system a mixture of air and fuel gas may be utilized in one or more stages.

The retort 30 comprises retort bodies 44 and 45 secured to a supporting base 46 on opposite sides of the skelp. The supporting base extends from the final stand of the rolling mill, as shown in Fig. 2. The retort bodies 44 and 45 are held in position on the base 46 by screws 47 which extend through slots 48 (Fig. 1) in the retort bodies. These slots permit the retort bodies to be moved closer or further apart to accommodate skelps of different width.

Referring again to Fig. 7, each retort body comprises upper and lower sections 49 and 50 hollowed to form a chamber 51 for the burner block 38, and formed with mating portions 52 and 53 at the front and rear end. Shims 54 between these mating portions establish the proper vertical distance between the surfaces 55 and 56 of the retort sections which overlap the upper and under surfaces of the margin of the skelp. The height of the skelp passages through the retort is slightly greater than the thickness of the skelp so that it can pass through these passages with little friction, but the surfaces 55 and 56 serve as guides to keep the skelp substantially flat until it reaches the end of the retort and begins to bend under the pull from the rollers 32 and 33 of the first forming pass.

The shims 54 serve as side guides when the front end of the skelp passes into the retort, but after the skelp has entered the rollers 32 and 33 of the first forming pass ordinarily no side guides are necessary, because these rollers have a speed along their median lines slightly greater than the peripheral speed of the rolls in the final rolling pass so that the skelp is under some tension and is held in a central position as it passes through the retort 30.

Water or other cooling fluid circulates through passages 58 to prevent the retort from becoming overheated. The cooling fluid enters and leaves the passages 58 through hose or pipe connections (not shown).

The retort, and likewise the other retorts, are preferably made of bronze, or abrasion-resisting iron or steel, or the surfaces which contact with the skelp may be copper-plated so that they will not tend to stick to the skelp and wear excessively.

The burner blocks 38 are clamped against bosses 60 on the lower sections 50 of the retort by screws 61 extending through slots in the burner blocks. The heads of the screws 61 are high enough to extend through openings in the upper sections 49 so that a wrench can be conveniently applied to these screws to release them when the positions of the burner blocks in the retorts are to be changed. When using oxyacetylene flames, the jet faces of the burner blocks are positioned close enough to the skelp so that primary combustion takes place immediately adjacent the edge faces of the skelp. The products of the primary combustion, containing reducing gases, blanket the edges, and the final products, at a temperature twice or more the skelp temperature, sweep inward over the upper and under surfaces of the skelp, heating them so that heat loss from the edges by conduction into the body of the skelp is minimized. By the action of the heat and of the gases, in this and in the other retorts, the edges are deoxidized and purified and any gas pockets in the edge metal are substantially eliminated, and the highly heated skelp is protected from oxidation by contact with the air.

The surfaces 55 and 56 confine the products of combustion and cause them to flow across the upper and lower faces of the skelp. These surfaces may be grooved to provide more space for the flow of gases from the retort. Air for burning the products of the primary combustion enters the chambers 51 around the sides and ends of the burner blocks 38. The retort bodies can be made with no space for the entrance of air around the torch blocks, in which case the oxygen for the secondary combustion may be supplied through auxiliary jets opening into the chambers 51. Much of the oxygen necessary to support the secondary combustion may be supplied in the mixture fed through the flame jet openings of the torch blocks. When the hot skelp is passing through the retort, combustion becomes substantially complete within the restricted retort chambers, little or no visible flame issuing therefrom into the atmosphere.

Fig. 8 is a sectional view of the retort 35. This retort comprises side blocks 63, 64, which are secured to brackets 65 (Fig. 2) extending from the forming mill stands 24 and 25. The side blocks are shaped at their ends to extend part-way between the upper and lower roll of each stand.

Referring again to Fig. 8, a center block 67 is located between the side blocks 63, 64, and held spaced from the side blocks by transverse supports 68 which are fastened to the center block 67 and side blocks 63, 64 by screws 69. With the blocks in the assembled relation shown in Fig. 8 they enclose a skelp chamber 70 and torch chambers 71 opening into the skelp chamber.

The skelp chamber 70 has a cross-section similar to that of the skelp 17 as it comes from the forming pass 24, but is large enough to allow sufficient space for the flow of the products of combustion downward away from the torch chambers and across the surfaces of the partially-formed skelp. The most intense heat is applied directly to the skelp edges, and the products of combustion, hotter than the skelp and flowing over its surfaces, heat the body of the skelp. The high-temperature gases acting on the edges reduce and purify the edge metal, so that when the edges are brought together and united, the weld that is made is free of oxide, of exceptional strength and without defects. Furthermore, the reducing action extends over the outer and inner surfaces of the skelp. By bathing the skelp surfaces, generally, as it passes through this retort, and also as it passes through preceding retorts, with hot gases more or less reducing in their action, not only is the skelp as a whole protected from oxidation during these stages, but also mill scale or oxide which formed on the skelp in its progress through the rolling mill passes is virtually eliminated. The remainder of such scale is in the form of a loose powder. The elimination of mill scale by the flame gases is aided by the loosening of the scale by the bending of the skelp in the forming operation.

The products of combustion which pass across the outside surface of the skelp escape from the retort through slots 72 in the side blocks and through the space between the side blocks at the bottom of the retort. A conduit 73 in the center block 67 communicates with the skelp chamber 70 through slots 75. The products of combustion flowing across the inside surface of the skelp escape through the slots 75 and conduit 73. A suction pipe 76 (Fig. 9) draws the gases out of the conduit 73.

Referring again to Fig. 8, torches 78 and 79 are clamped against bosses on the center block 67, by screws 80 which extend through slots in the side blocks for convenient access when the torches are to be adjusted in the torch chambers to regulate the spacing of the flame jets with respect to the edge faces of the skelp. This movement of the torches permits the retort to be used with skelps of slightly different width. Oxygen for the secondary combustion is supplied from a conduit 82 in the center block. This conduit communicates with the torch chambers 71 through slots 83.

Air for secondary combustion is aspirated around the sides of the torches 78 and 79, but the upper sides of the torch chambers may be completely closed and all of the oxygen for the secondary combustion supplied under pressure through the slots 83 or similar passages in the side blocks or in a cover extending between the side blocks, or some of the oxygen for the secondary combustion may be supplied through such passages and some through the flame jet orifices of the torches.

The side blocks 63, 64 are cooled by liquid flowing through passages 84, 84'. The center block 67 is cooled by liquid flowing in a cooling chamber 85, best shown in Fig. 9.

The torches 78 and 79 are similar to the torches in the retort 30, with the exception of a slight curve at the ends of the torches 78 and 79 shown in Fig. 1. This curve of the torches enables them to follow the edges of the skelp as they move toward each other when approaching the final forming pass.

The skelp edges come together in the bite of rolls 86, 87 in the stand 25 to complete the forming operation and produce a welded pipe or tube. The weld is preferably rolled down immediately between the upper roll 86 of the final forming pass and a roller 88 (Fig. 9) inside of the tube. The roller 88 is supported by a roller 89 which bears against the bottom of the tube. These rollers 88 and 89 have their axes on the center line of the rolls 86 and 87, and are held against movement lengthwise of the tube by axles which extend from both sides of the rollers into slots in the bifurcated end of a mandrel 91.

An end piece 92 is fastened to the mandrel between the bifurcations. This end piece follows the curve of the roller 88 above the axle of the roller and limits the movement of the roller in the vertical slots of the mandrel so that the roller axles can not come out of the slots when the roller is not in a tube. The end piece 92 extends part-way under the lower roller 89 and prevents it from dropping out of the mandrel slots when not supported by a tube.

The mandrel 91 is connected, by pins 94, at its forward end, to an extension of the center block 67. A conduit 95 through the mandrel 91 registers with a passage 96 which leads to the cooling chamber 85 of the center block 67. Water is discharged on the rollers 88 and 89 from the conduit 95 to cool the rollers.

The upper roller 88 is crowned and the radius of the crown is the inside radius of the pipe, as shown in Fig. 10. The lower roller 89 has a similar crown except for a center groove 97 which is provided to increase the area of bearing contact between the rollers 88 and 89.

Fig. 12 is a longitudinal sectional view of the torch 79 showing the chamber 98 from which the fuel and oxygen mixture is discharged through the jet openings 99. The torch is cooled by the circulation of water through conduits 100 (Figs. 8 and 12). The gas is supplied to the chamber 98 through a stem 102, which corresponds with the stems 42 of the torches shown in Fig. 7.

Figs. 13 and 14 are transverse sectional views through the retort 31. This retort is supported by the base 46 and has blocks 104 which guide the skelp when the forward end of the skelp first enters the retort. A center block 105 is held over the skelp by transverse supports 106.

The retort 31 comprises retort bodies 108 and 109, which are illustrated diagrammatically in Figs. 13 and 14. These retort bodies are similar in construction to the retort bodies 44 and 45 shown in Fig. 7, except that the retort bodies 108 and 109 and their torches 110 are warped to follow the edges of the skelp as the skelp bends from its flat condition in the retort 30 to its substantially U-shaped contour in the bite of the rolls 32 and 33. Passages for cooling liquid and other details shown in the retort bodies in Fig. 7 are omitted in the diagrammatic illustration of Figs. 13 and 14.

The blocks 104 and center block 105 confine the products of combustion which issue from the retort bodies 108 and cause these products of combustion to flow over the surface of the skelp. There are grooves 112 in the faces of the blocks 104 and center block 105. The blocks 104 are separated to provide a slot 113 between them and have passages 114 recessed in their opposing side faces and bottom faces for the escape of products of combustion which flow across the bottom face of the skelp. The center block 105 has passages 115 and 116 for the escape of the products of combustion which flow across the top surfaces of the skelp.

Fig. 15 shows a modified form of the invention in which skelp 117' from a mill, furnace, or other supply source passes through roll stands 124 and 125 which are similar to the stands 24 and 25 previously described. A third roll stand 126 is located between the roll stands 124 and 125 to bend the partially-formed skelp from the substantially U-shaped contour with which it comes from the first forming pass to a generally oval cross-section.

The partially-formed tube is indicated by the reference character 117' and the complete welded tube by 117". Figs. 16-19 show the cross-section of the metal at different stages of its progress through the apparatus of Fig. 15.

The edge faces of the metal are heated first in a retort 130 while the skelp is flat, and then in a retort 131 which has a warped shape to accommodate the changing shape of the skelp as it enters the first forming pass 124. The edges of the partially-formed metal are heated in a retort 135. All of the heating retorts of Fig. 15 thus far described are similar to the retorts 30, 31 and 35.

The roll stand 126 includes two rolls 137 and 138 (Fig. 20) which may be termed "gathering rolls." These rolls bring the edge portions of the partially-formed tube closer together, and the faces of the rolls are preferably proportioned to the width of the skelp to be operated on so that the edge faces of the skelp project for some distance beyond the concave faces of the rolls as shown in Fig. 20. A torch 140 heats these edges in the roll pass as they travel from the gathering rolls to the welding roll stand 125. The torch 140 is supported by a frame 141 and has jet orifices 142 disposed to project oxy-fuel gas flames, preferably oxy-acetylene, against both edge faces of the partially-formed tube 117'.

Envelope gases from the torch flames are confined close to the outside surface of the partially-formed tube by a retort 143 comprising grooved-face guides extending along both sides of the run of the partially-formed tube between the gathering roll stand 126 and the welding roll stand 125.

A mandrel 145 extends from the retort 135 back through the gathering roll pass and into the welding roll pass where it holds rollers 148 and 149 between the welding rolls and substantially on the center line of the welding rolls. The rollers 148 and 149 are similar to the rollers 88 and 89 previously described, and the mandrel 145 is similar to the mandrel 91 but considerably longer in order to reach back through the gathering roll pass 126 and the retort 143 to the welding rolls.

The invention has been described as applied to the manufacture of pipe or tubing in a continuous operation with the rolling of the skelp, but it will be understood that features of the invention are applicable to the manufacture of pipe or tubing from preheated skelp or even from cold skelp. The invention is not limited to the embodiment illustrated, and features of the invention may be used without others.

I claim:

1. A heater for raising skelp edges to a welding condition while said edges move with continuous motion between successive roll stands of a mill which forms the skelp and brings the seam edges together, said heater including in combination guiding or confining means constructed and arranged to accommodate the warped contour of the run of the skelp edge portions between said roll stands, and edge-heating means having orifices disposed in position to project heating jets directly against the edge faces of the forming tube to bring said edge faces to a welding condition before they come together in the final forming roll stand.

2. Retort means adapted for use between the roll stands of a mill having a plurality of roll stands constructed and arranged to operate simultaneously on different portions of the same skelp to form it into a tube and bring the seam edges together, said retort means being shaped to accommodate the contour of the skelp between the forming stands, and including oxy-hydrocarbon fuel gas torches with orifices in positions to project flame jets directly against the edge faces of the partially-formed tube, the orifices being disposed at different angles along the length of the skelp edges in accordance with the warped surface of the forming tube, and guide surfaces confining the reducing envelope gases from the torches across the surfaces of the partially-formed tube so that said gases blanket the metal and reduce any oxide on the surfaces.

3. A retort for heating a forming tube during its passage from a forming roll stand to a welding roll stand where the forming is completed and the skelp edges are brought together to make the weld, said retort comprising parts shaped to the contour of the run of skelp between the roll stands with which the retort is intended to be used, and heating means having orifices disposed at different angles at different regions lengthwise of the skelp edges in positions to project heating jets directly against the edge faces of the forming tube during its travel through the retort.

4. A heating retort shaped to receive a partially-formed tube while the edge portions of said partially-formed tube are in the warped form assumed during their passage to the final forming pass of a forming mill, oxy-fuel gas torches in the retort with jet orifices disposed at different angles at different regions along the lengths of said torches for projecting intensely hot oxy-fuel gas flames directly against the warped edge faces of the partially-formed tube while said edges are in continuous motion, and guides in said retort for confining and guiding envelope gases from the flames across the surfaces of the partially-formed tube.

5. Apparatus for the manufacture of welded pipe or tubing, said apparatus including in combination heating means shaped to conform to the warped edge surfaces of a skelp as the contour of the skelp changes during a progressive forming operation, said heating means having warped faces with orifices disposed along the lengths of said faces and located in positions to project an elongated system of heating jets directly against the warped edge faces of the forming skelp, and guide means for the partially-formed skelp in the vicinity of said heating means.

6. A retort for use with a forming mill for heating the edge faces of a partially-formed tube, said retort including torch means with jet orifices in position to direct flame jets against the edges of a partially-formed tube as it travels through the retort with continuous motion toward a forming pass of said mill, guide surfaces confining the products of combustion from the torch means close to the outside surface of the partially-formed tube, exhaust passages through said guide surfaces, and a center guide extending inside of the partially-formed tube for confining the products of combustion that enter the partially-formed tube, said center guide having exhaust passages leading from the region of the mid-portion of the partially-formed tube to a vent outside of said partially-formed tube.

7. A heating retort including torch means with jet orifices in position to direct flame jets against the edges of a partially-formed tube moving progressively through the retort, guide means for confining the products of combustion from the torch means close to the surface of the partially-formed tube as said products flow away from the torch, said guide means including a center guide which extends between the edges and inside of said partially-formed tube, said center guide having exhaust passages leading from the region of the mid-portion of the partially-formed tube to a vent outside of said partilly-formed tube.

8. A tube welding machine including means for heating the edges of a partially-formed tube blank while said tube blank is in motion, guide means holding the moving tube blank in the desired relation to said heating means, a mandrel inside of that portion of the tube blank which is being acted upon by the heating means, said mandrel being hollow and having one or more ports through which gases from the heating means that enter the tube blank flow into said mandrel, and an exhaust conduit for the escape of gases from inside the mandrel to the outside atmosphere.

9. Tube welding apparatus comprising at least three stands of forming rolls, edge-heating retorts between successive roll stands, and the heating means in the retorts including torches having jet orifices disposed to project flame jets directly against the edge faces of the run of the metal between successive stands of forming rolls.

10. The combination with a forming mill having three or more forming stands through which a length of metal travels to bend it progressively to tubular form and bring the edges together, of heating apparatus including torch means located along the run of the partially-formed tube between the last two forming stands with the torch means in position to project high-intensity flame jets directly against the edge faces, and other heating apparatus located along the edges of the metal in position to preheat said edges as they travel between successive forming stands ahead of the next-to-last forming stand.

11. Tube welding apparatus comprising a roll stand which bends a skelp into a partially-formed tube, a second roll stand which bends the partially-formed tube to a contour which disposes the edges of the metal in confronting but substantially spaced relation, a retort between said roll stands including means for heating the edges of the skelp, other heating apparatus beyond the second roll stand including torch means located along the confronting faces in position to project flame jets directly against said faces to heat them to a welding condition, and a third roll stand immediately beyond said other heating apparatus for bringing the edge faces together to make a weld.

JAMES L. ANDERSON.